United States Patent [19]

Boumarafi et al.

[11] Patent Number: 5,186,495
[45] Date of Patent: Feb. 16, 1993

[54] ADJUSTABLE SEAT BELT ANCHORAGE

[75] Inventors: Mohamed Boumarafi, Rochester Hills; Carl Pondell, Sterling Hgts.; Donald A. DiPaola, Mount Clemens, all of Mich.

[73] Assignee: Allied-Signal Inc., Morris Township, Morris County, N.J.

[21] Appl. No.: 764,595

[22] Filed: Sep. 24, 1991

Related U.S. Application Data

[63] Continuation-in-part of Ser. No. 664,418, Mar. 1, 1991, Pat. No. 5,050,907, which is a continuation of Ser. No. 546,132, Jun. 29, 1990, abandoned.

[51] Int. Cl.$^5$ ............................................. B60R 22/20
[52] U.S. Cl. .................................. 280/808; 297/483; 297/486
[58] Field of Search ................ 280/801, 808; 297/483, 297/486

[56] References Cited

U.S. PATENT DOCUMENTS

| | | | |
|---|---|---|---|
| 4,522,426 | 6/1985 | Weman | 280/808 |
| 4,573,708 | 3/1986 | Brorsson | 280/808 |
| 4,610,464 | 9/1986 | Yasumatsu et al. | 280/808 |
| 4,786,081 | 11/1988 | Schmidt | 280/808 |
| 4,971,359 | 11/1990 | Takahashi et al. | 280/808 |
| 5,050,907 | 9/1991 | Boumarafi et al. | 280/808 |

FOREIGN PATENT DOCUMENTS

| | | |
|---|---|---|
| 2947391 | 5/1981 | Fed. Rep. of Germany . |
| 8703094 | 5/1987 | Fed. Rep. of Germany . |
| 2564792 | 11/1985 | France . |

Primary Examiner—Kenneth R. Rice

[57] ABSTRACT

An adjustable seat belt anchorage (20) comprising: a guide rail (22) adapted to be secured to a portion of a vehicle (24) generally at or above occupant shoulder height, the guide rail (22) forming an open channel (34), and a plurality of pairs of cut-outs (36) oppositely positioned in front walls (28) thereof; a latch plate assembly (50) comprising: a resilient carrier (52) slidingly received within the channel (34); a latching mechanism (54) biased into the guide rail by the carrier (52) and supported by and movable within the carrier (52) including a latch bar (112) extending upwardly from the carrier (52) for engaging a selected pair of cut-outs (36). A flat spring (130) arcuately shaped spring (200) or coiled spring (222) is provided to bias the latch bar (112) into the selected cut-out (36).

16 Claims, 7 Drawing Sheets

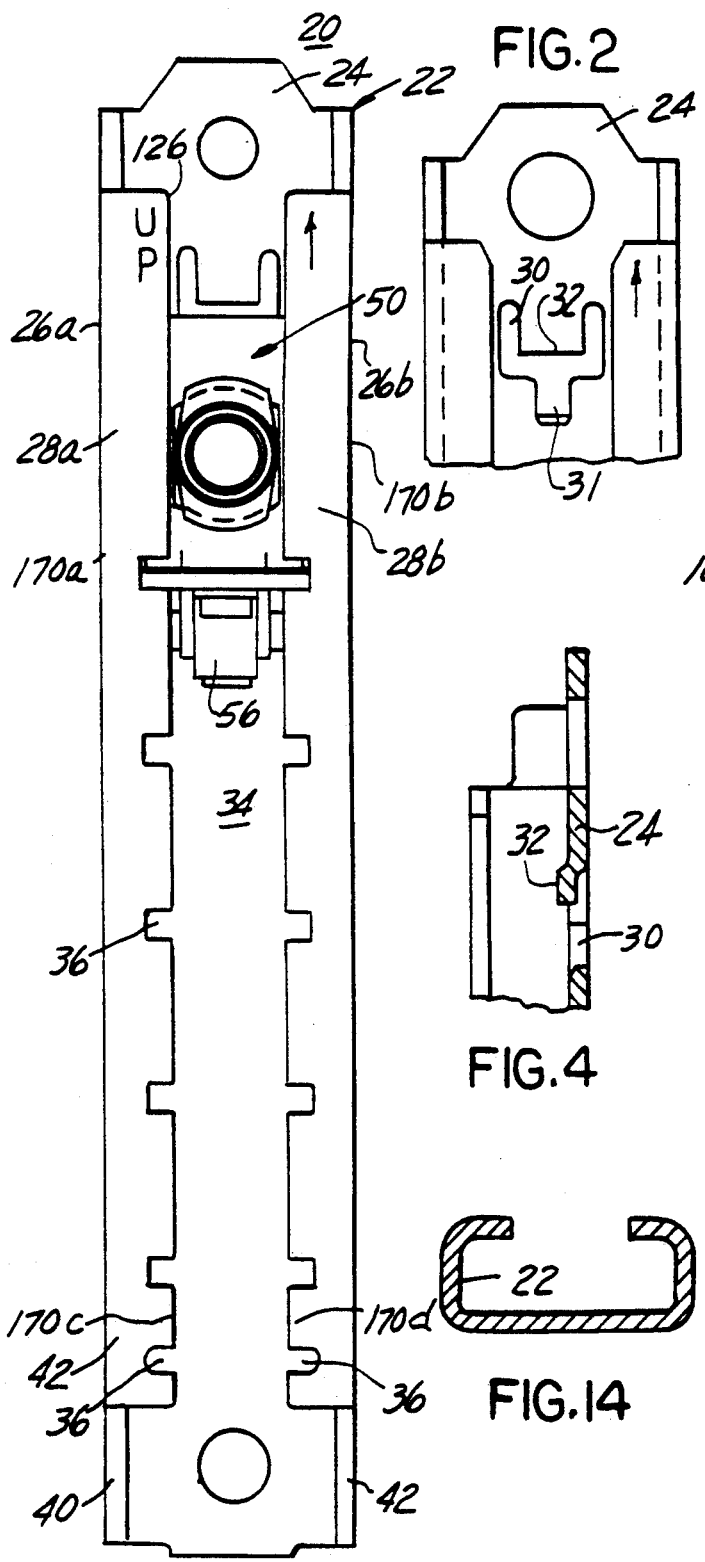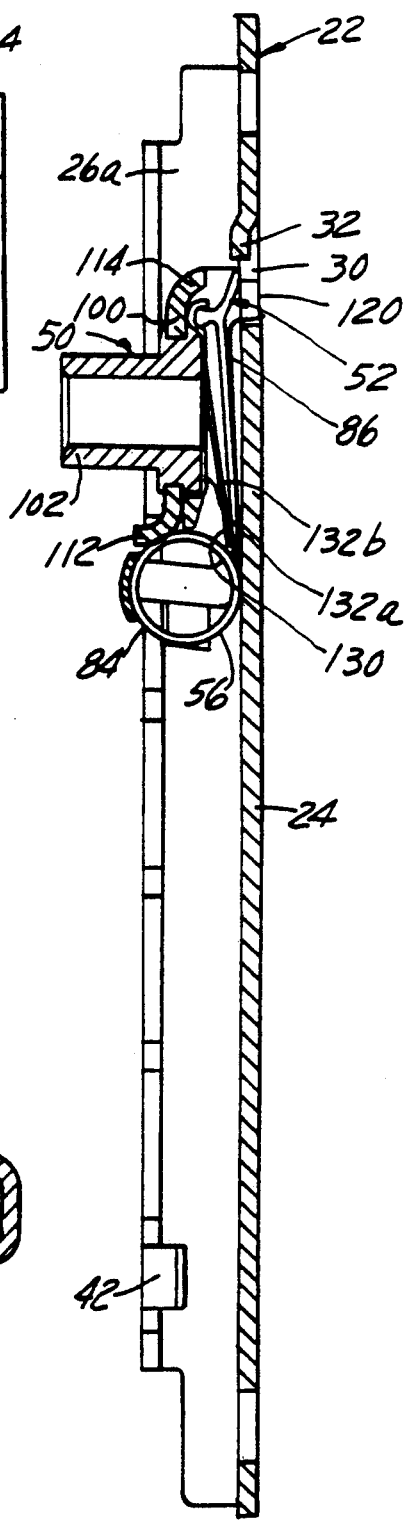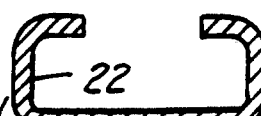

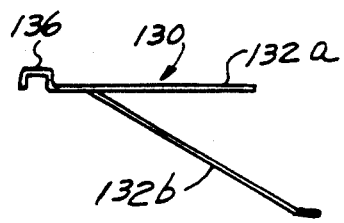
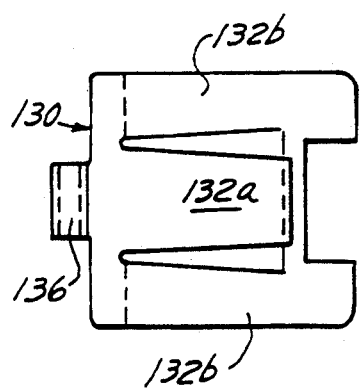
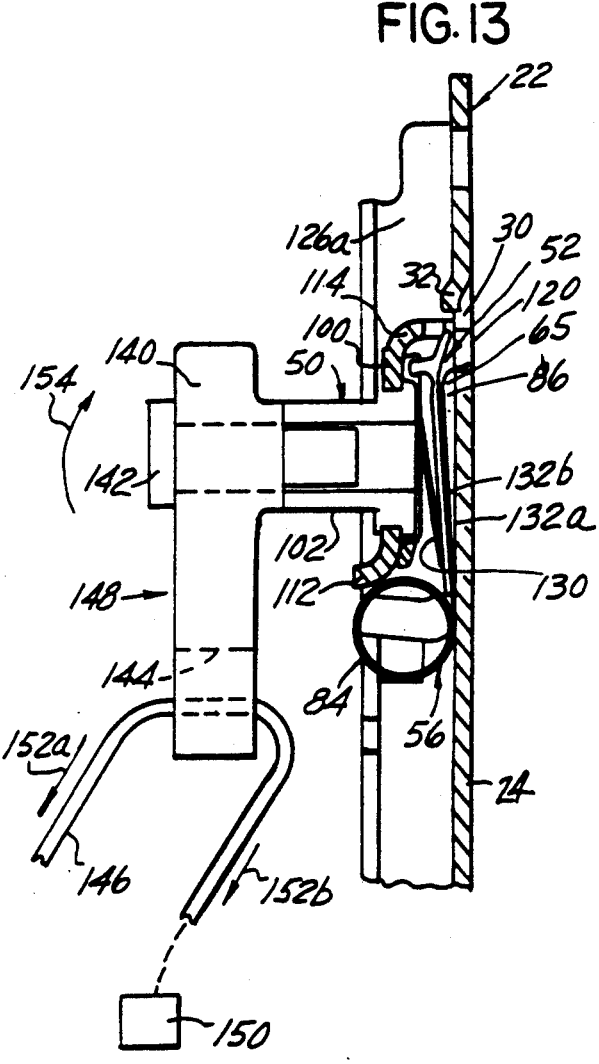
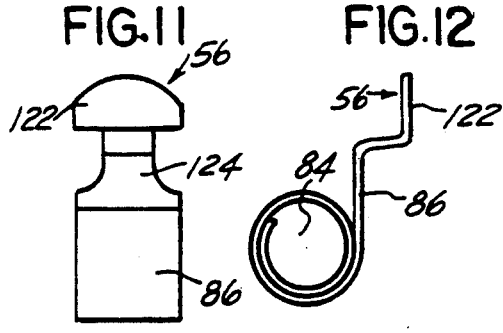

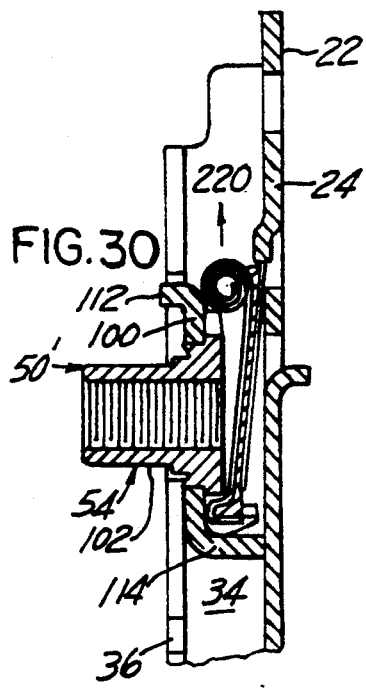
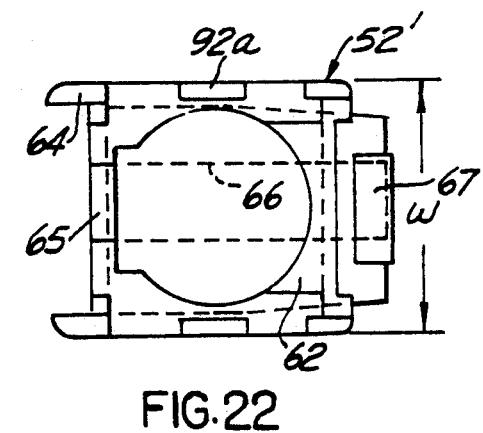
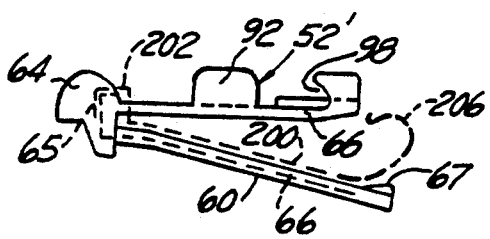
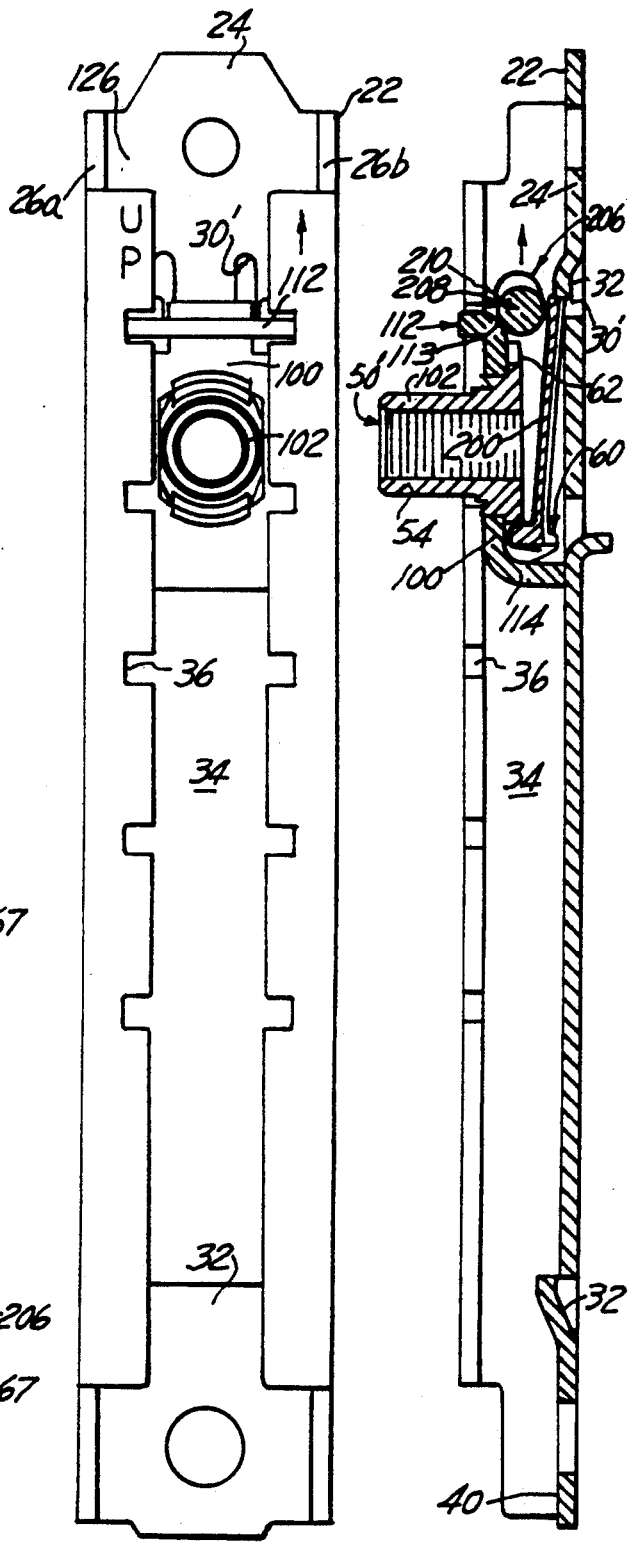

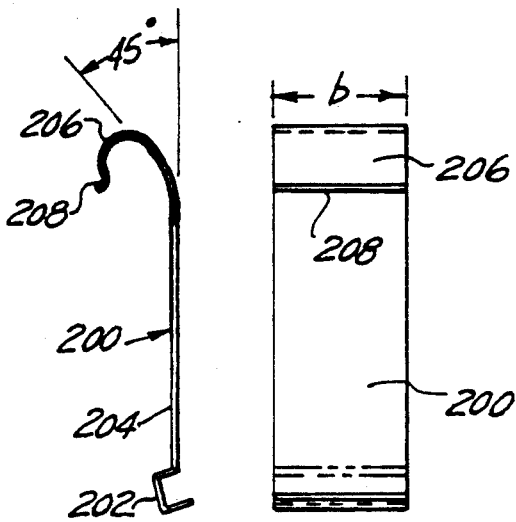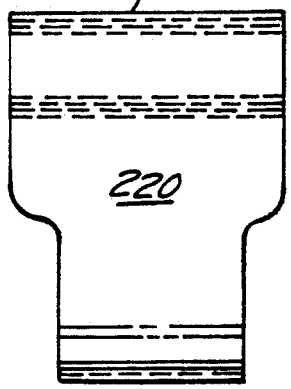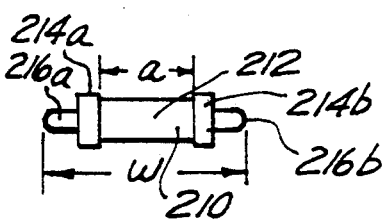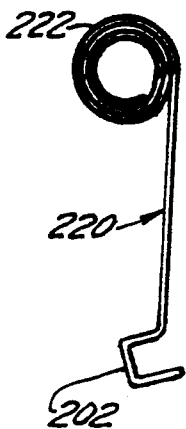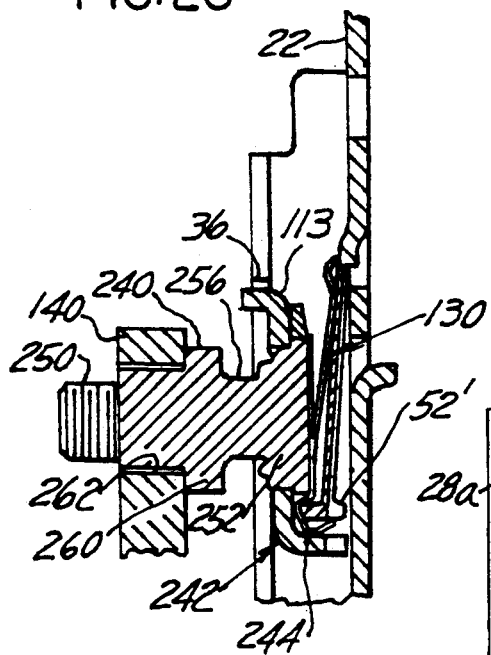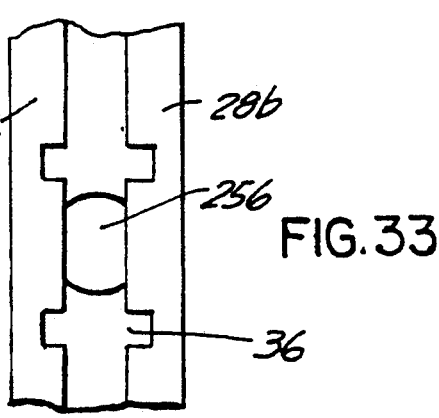

ADJUSTABLE SEAT BELT ANCHORAGE

This application is a continuation-in-part of U.S. Ser. No. 07/664,418, filed Mar. 1, 1991, now U.S. Pat. No. 5,050,907, issued Sep. 24, 1991, which is a continuation of U.S. Ser. No. 07/546,132, filed Jun. 29, 1990, abandoned.

BACKGROUND AND SUMMARY OF THE INVENTION

The present invention relates to an adjustable anchorage for seat belts for the protection of vehicle occupants. The present invention finds application in what is known as a three-point seat belt system in which the seat belt and in particular the shoulder belt portion is looped through a D-ring or similar device which is often fixedly attached to the "B" pillar of a vehicle. The rigid attachment of the D-ring or anchorage to the vehicle does not provide flexibility in the operation of the seat belt system to accommodate varying sizes of the occupants. In a system employing a fixed anchorage, the anchor point is chosen to accommodate an occupant of average size. In this manner the shoulder belt is designed to contact the shoulder of the occupant and then extend diagonally across the occupant's torso to a buckle. This, however, is not the case with occupants who are taller or shorter than average. To accommodate for varying size of occupants, adjustable anchorage mechanisms have been proposed in the prior art, one of which is the commonly owned U.S. Pat. No. Re. 32,524. Other adjustable anchorage mechanisms can be found in U.S. Pat. No. 4,556,255 as well as in a variety of Great British patent applications such as 2,124,889; 2,132,071; 2,136,070 and 2,138,670.

It is an object of the present invention to provide a manually adjustable seat belt anchorage which is of simple construction and one which maintains its structural integrity and performance during high deceleration and vehicle crash situations.

Accordingly, the invention comprises: an adjustable seat belt anchorage comprising: a guide rail adapted to be secured to a portion of a vehicle generally at or above occupant shoulder height. The guide rail forms an open channel, and includes a plurality of pairs of cut-outs or slots oppositely positioned in front walls of the guide rail. The anchorage further includes a latch plate assembly comprising: a resilient carrier slidingly received within the channel; a latching mechanism biased into the guide rail by the carrier and supported by and movable within the carrier. The latching mechanism includes a latch bar extending upwardly from the carrier to engage a selected pair of cut-outs and an attachment means such as a threaded bushing or threaded stud for supporting a safety belt support device such as a D-ring. The latching mechanism is moved to engage a different set of cut-outs by depressing it and sliding it in the guide rail. Various springs are used to supplement the resiliency of the carrier. In one embodiment the spring is bifurcated. In another embodiment a flat spring is used having a bent end. A roller is inserted in the bent end which engages a curved end of the latch bar as a function of the degree to which the latching mechanism is depressed. The use of the roller and spring provide for a means of varying the force exerted on the latch bar. In another embodiment of the invention the roller and bent spring are replaced with a rolled spring.

Many other objects and purposes of the invention will be clear from the following detailed description of the drawings.

BRIEF DESCRIPTION OF THE DRAWINGS

In the drawings:

FIG. 1 illustrates a front plan view of a guide rail and a latch plate assembly.

FIG. 2 is a partial view of FIG. 1 without the latch plate assembly.

FIG. 3 illustrates a cross-sectional view taken through section 3—3 of FIG. 1.

FIG. 4 is a partial view of FIG. 3 without the latch plate assembly.

FIGS. 11 and 12 illustrate front and side views of a spring.

FIG. 13 illustrates an D-ring attached to the latch plate assembly.

FIG. 14 illustrates a cross-sectional view taken through section 14—14 of FIG. 2.

FIGS. 15 and 16 illustrate various views of a spring.

FIGS. 20 and 21 illustrate an alternate embodiment of a guide rail and latch plate assembly.

FIGS. 22 and 23 illustrate various views of an alternate carrier usable with the guide rail and latch plate assembly of FIGS. 20 and 21.

FIGS. 24 and 25 illustrate various views of a spring.

FIG. 26 illustrates a view of a roller.

FIGS. 28 and 29 illustrate an alternate embodiment of a spring.

FIG. 30 illustrates an alternate embodiment of the invention.

FIG. 31 illustrates a further alternate embodiment of the invention.

FIGS. 32 and 33 illustrate still another embodiment of the invention.

DETAILED DESCRIPTION OF THE DRAWINGS

Figure 5:
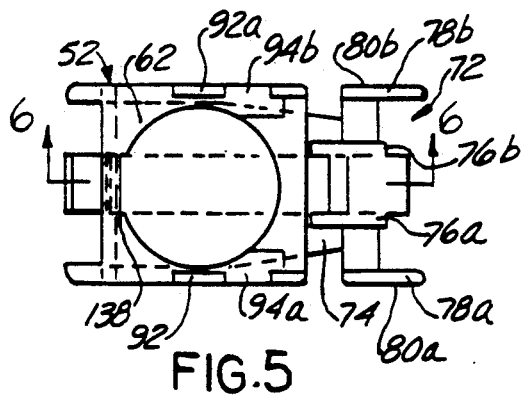
FIGS. 5–8 illustrate various views of a carrier.

FIGS. 1 through 4 illustrate many of the major components of an adjustable seat belt anchorage 20. More specifically, these figures illustrate a guide rail 22 adapted to be secured to the "B" post of a vehicle at or above shoulder height of the occupant. The guide rail includes a rear wall 24, side walls 26a and b and spaced front walls 28a and b forming a channel or groove 34. Formed in the top portion of the guide rail 22 is a Y-shaped slot 30, having a lower cut-out 31. A center tab 32 formed in the rear wall 24 extends into the channel or open groove 34 to provide a mechanical stop. The front walls 28a and b include a plurality of oppositely positioned pairs of cut-outs or slots 36. The lower end 40 of the top walls 28 are bent over such as at 42 to provide another mechanical stop. Slideably positioned within the guide rail 22 is a latch plate assembly 50, also shown in FIGS. 1 and 3. The latch plate assembly 50 comprises a carrier 52 (also shown in FIGS. 5 through 8), and a latching mechanism 54 (also shown in FIGS. 9 and 10), and a return spring 56. As is evident from the drawings, the carrier 52 supports the latching mechanism 54.

Figure 6:
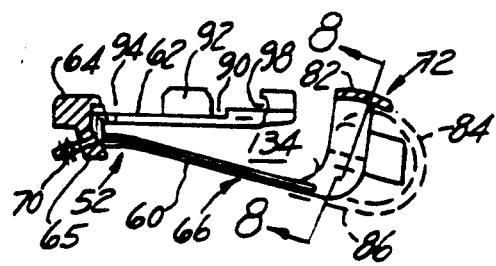
Figure 7:
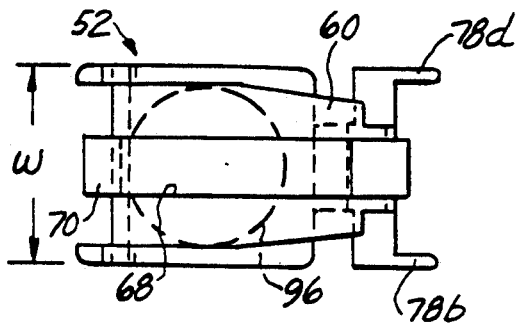
Figure 8:
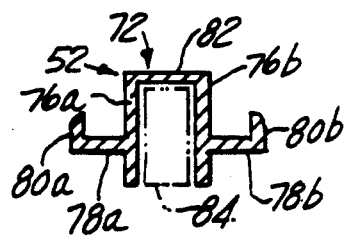

In the above referenced figures, the carrier 52 is fabricated of a resilient material having a low coefficient of friction such as an acetal copolymer. The carrier 52 comprises a lower carrier plate 60 and an upper carrier plate 62 extending from a reinforced end 64, the lower portion 65 of which slides on the rear wall 24. The width of the carrier plate w is slightly smaller than the width of the channel or open groove 34 to permit entry. The lower carrier plate 60 is flexible, and in its bottom region generally shown as 66 (see FIG. 7), has a centrally disposed groove 68 under which is received a portion of the spring 56 and which reduces the surface area in contact with the rear wall 24 to reduce sliding friction. A lubricant may also be applied to the rear wall to reduce friction. A portion 70 of the lower carrier plate 60 essentially positioned in the cut-out region 66, proximate the end 64, extends axially out from the carrier 52. As will be seen from the description below, and as can be seen from FIG. 3, this extension 70 engages the tab or stop 32 preventing the latch plate assembly 50 from sliding out from the top of the groove 34 of the guide rail 22. Extending upwardly from the lower carrier plate 60 is a spring retainer and carrier guide mechanism, generally shown as 72. This mechanism extends from the narrowed end 74 of the lower carrier plate and comprises a pair of spaced vertically extending posts 76a and b. Extending laterally from each post are radial flanges or ribs 78a and b, defining engagement surfaces 80a and b, which coact with the interior of the side walls 26a and b to prevent skewing of the carrier 52 as it slides within the channel 34. A top portion joins the posts generally shown as 82, and is arcuately shaped. A coiled portion 84 (shown in phantom line) of the spring 56 is received between the posts 76 and top 82. As shown in FIG. 6, a flat portion 86 of the spring extends underneath the lower carrier plate in the groove 68. The spring portions 84 and 86 are shown in phantom line in those Figures. As can be appreciated, the spring biased the carrier 52 upwardly.

With reference to FIGS. 5 and 6, it can be seen that the top carrier plate 62 comprises a recess 90 formed by partial walls 92 including cut-out portions 94 to receive the latching mechanism 54. The top carrier plate 62 further includes a central opening 96, the purpose of which will be described below. Part of each wall 92 includes a recess or cut-out such as 98 for receipt of another portion of the latching mechanism 54.

Figure 9:
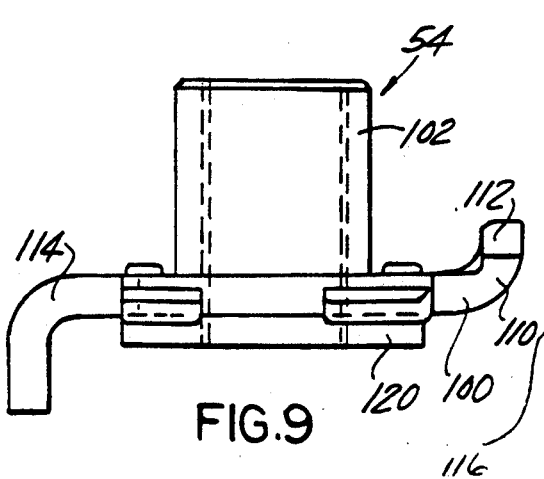
FIGS. 9 and 10 illustrate side and top views of a latch mechanism.
Figure 10:
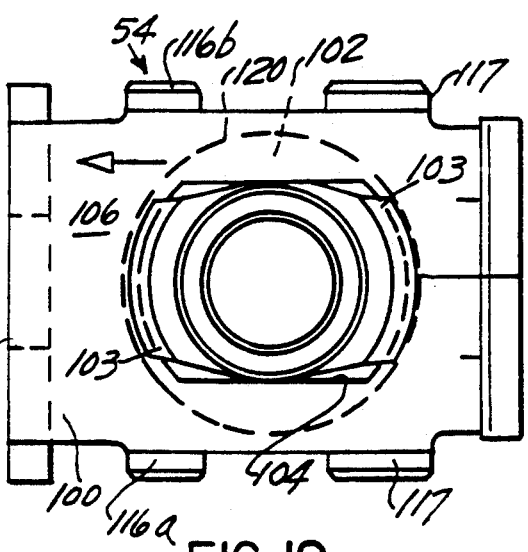

With reference to FIGS. 9 and 10, there is shown the latching mechanism 54 which comprises a latch plate 100 and bushing 102. The latch plate includes an opening 104 in a generally central flat portion 106 thereof. The bushing is inserted through the opening 104. A portion 103 of the bushing is swaged against the flat portion 106 of the latch plate 100. At one end 110 the latch plate curves upwardly forming a latch or bar 112. At the opposite end the latch plate 100 curves downwardly at end 114 and includes a cut-out 116 through which is received the extending portion 70 of the carrier 52. Formed as part of the flat portion 106 are extending flanges 116a and b. Flanges 116a fit within the openings 94 formed within the carrier 50, while flanges 116b fit within similar openings 94b. Ends 117 of these flanges are also received within the cut-outs 98 formed in the carrier 52. During assembly, the latch plate 100 is fitted to the recess 90 of the upper plate 62 of the carrier such that flanges 116a fit within the spaces 94, flanges 116b fit and snap within the recess or cut-out 98 and the downwardly curved portion is secured in the end 64. In this position, the flanged portion 120 of the bushing extends into the opening 96 of the carrier.

FIGS. 11 and 12 illustrate various views of the spring 56 in its coiled configuration. The spring 56 is a coiled spring having a coiled portion 84 and an end portion 122 formed in a T shape. Below this end portion is a narrowed bent section 124. During assembly the end 122 is inserted within the narrowed section 31 of the Y-shaped groove 30 such that the wings of the T-shaped end 122 reside on the back surface of the rear wall 24 which is shown in phantom line in FIG. 3.

Assembly of the above-described anchorage 20 is performed as follows. The spring 56 is inserted within the groove 30 in the manner described above such that the coiled portion 86 resides just below the narrowed portion of the groove 30. The latch plate assembly 50 (comprising the carrier 52 and latching mechanism 54) is slid within the top open end 126 of the guide rail 22 with the carrier guide mechanism 78 entering the guide rail first. The latch plate assembly 50 is depressed such that the bar 112 resides below the front rails 28 thereby partially entrapping the latch plate assembly 50 to the guide rail 22. Thereafter, the latch plate assembly 50 is urged downwardly into the channel 34 whereupon the spring 56 is entrapped by the retainer formed by the posts 76, and curved top portion 82. The further downward motion of the latch plate assembly 50 pushes the coiled portion 84 of the spring downward in the channel unrolling same, permitting the now unrolled or flat portion 86 of the spring to lie below the groove 68 formed on the underside of the lower carrier plate 60. As the latch plate assembly 50 is moved further down the guide rail, the latch bar 112 will be positioned just below one of the pairs of cut-outs 36 whereupon the resilient carrier urges the bar upwardly into such cut-out, locking the latch plate assembly in place.

FIGS. 13, 15 and 16 also illustrates an alternate embodiment of the invention wherein an optional flat, bifurcated spring 130, having extending legs 132a and b is inserted within the V-shaped space 134 (see FIG. 6) within the carrier 52 thereby providing additional resiliency in the operation of the present invention. FIGS. 15 and 16 illustrate views of the spring 130. The spring 130 also includes a hook 136 extending from the body of the spring 130. The hook 136 is received in the recess 138 and extends over a portion of the end 64 (see FIGS. 3 or 13).

FIG. 13 illustrates a portion of FIG. 3. Attached to the latch plate assembly and more particularly to the bushing 102 is a D-ring 140 of known variety. As is known in the art, the D-ring is often called a turning loop. The D-ring 140 is rotationally secured to the bushing 102 by a fastener 142. The D-ring includes a loop or opening 144 for receipt of a portion of the seat belt 146. To reposition the D-ring, it is pushed inwardly (see arrow 148) thereby compressing the carrier 52, causing the latch bar 112 to move inwardly out of one of the cut-outs 36. With the latch bar 112 in this position, the occupant of the vehicle can move the D-ring up and down within the anchorage 20 such that the seat belt 146 is now able to extend across the shoulder and upper torso of the occupant in a comfortable manner. However, if only an inward force acts on the D-ring 140, the spring 56 will move the carrier to the top of the guide rail.

Figure 18:
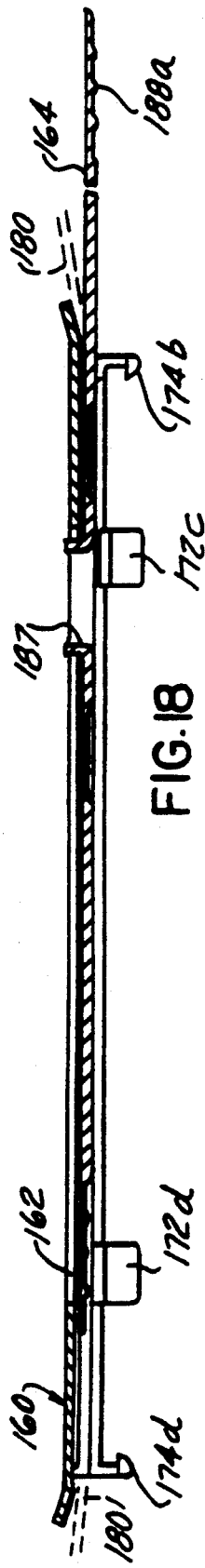
FIGS. 17, 18 and 19 illustrate a bottom plan, cross-sectional and end view of a cover for the guide rail and latch plate assembly.
Figure 19:
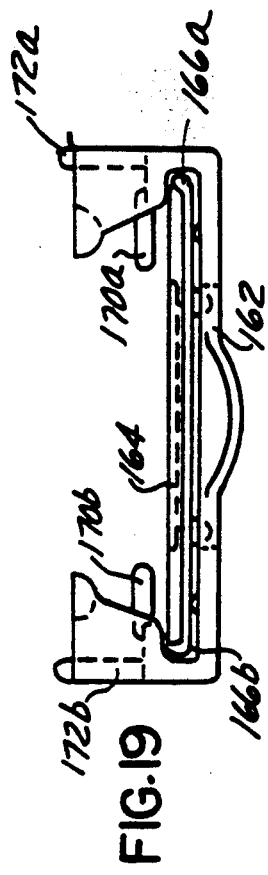
Figure 17:
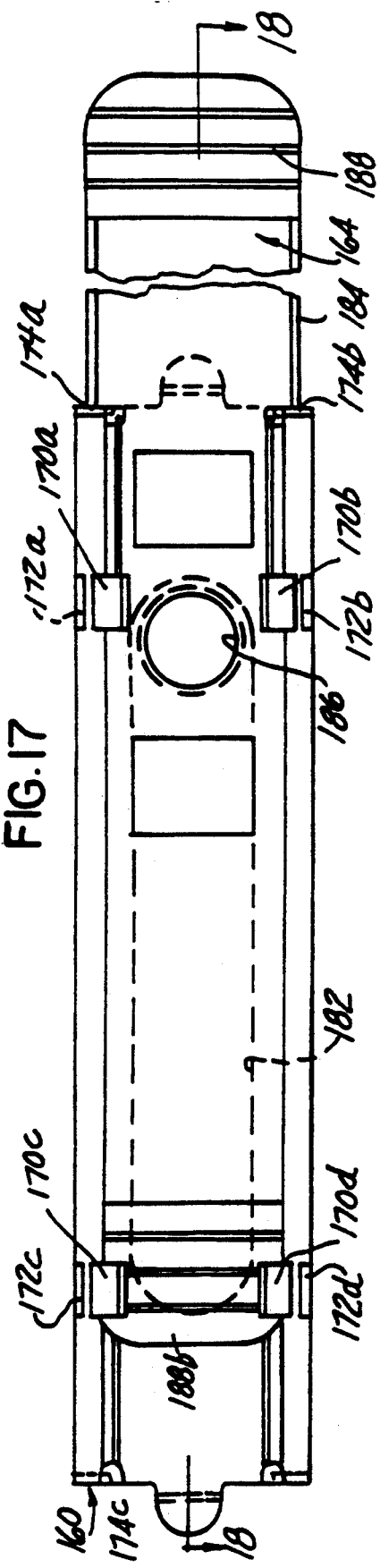

FIGS. 17–19 show various views of a cover assembly 160 for the guide rail 22 and latch plate assembly 50. The cover assembly 160 includes a cover plate or outer cover 162 adapted to snap fit over the guide rail and a slide or inner cover 164 movable with the latch plate assembly 50. The cover plate 162 is formed with two axially extending grooves 166a,b to receive the slide 164. Locking tabs 168a-d extend inwardly proximate the groove to snap fit to the guide rail 22 at the wide top and bottom portions of the front walls 28, such as at locations 70a-d (see FIG. 1). Extending downwardly from the cover plate 162 and a plurality of flat locating tabs 172a-d which engage the side walls 26 of the guide rail. Locking end tabs 174a-d are provided to snap fit with top and bottom portions of the guide rail 22. The ends 176a and b of the cover plate 162 are raised so that interior vehicle trim 180 (shown in phantom line) can fit therebehind, the plate 162 also includes an oblong opening 182. The slide 164 includes an oblong body 184 having a circular boss 187 defining an opening 186 through which the bushing 102 extends. Vertical motion of the slide 164 is limited when the boss 187 contacts the opening 182. As the bushing 102 is moved in the guide rail 22, the side 164 moves therewith. The ends 188a, b are made thinner than the body 184 so that it may curve if an obstruction interior to the vehicle trim is encountered so that these ends can flex. It should be appreciated that the ends 188 are positioned behind the vehicle trim.

It should be noted that the carrier 52 shown in FIGS. 2 and 3 is shown in its unstressed condition wherein only a portion of the bottom 66, near the spring retainer 74, and end 65 are in contact with the rear wall 24. When the bushing 102 is depressed, the flexible lower carrier plate 60 deforms against the rear wall 24 wherein a greater portion of the bottom 66 is in contact with the rear wall to permit the carrier to be slid easily into the rail 22.

During a crash situation, the shoulder belt 146 will be prevented from extending as a retractor mechanism 150 of known variety locks. In this crash situation, the occupant will tend to move forwardly thereby tensioning the seat belt 146 in the direction of the arrows 152a and b. In this stressed condition and by virtue of the mode of attachment of the D-ring to the latch plate assembly, a torsional force (see arrow 154) is imparted to the latch plate assembly 50. By orienting the bar 112 below the attachment point of the D-ring 140 to the bushing 102, takes advantage of the forces and torques generated during a crash situation thereby further urging the latch bar outwardly from the guide rail 22 and further into its corresponding cut-out 36 to insure that the latch bar remains in its selected position during such emergency situations.

Reference is now made to FIGS. 20 and 21 which illustrate a guide rail 22 having many of the features of the guide rail illustrated in FIGS. 1, 2 and 3. The guide rail 22 includes a U-shaped slot 30' which includes a center tab 32. Situated proximate the lower end 40 of the guide rail 22 is an additional tab 32. The tabs 32 will prevent the latch plate assembly 50' from sliding out of the rail 22. The latch plate assembly 50' comprises a carrier 52' and a latching mechanism 54 identical to the latching mechanism shown in FIG. 9. FIGS. 22 and 23 illustrate various views of the carrier 52'. As can be appreciated, the carrier 52' is substantially identical to the carrier 52 illustrated in FIGS. 5 through 8, with the exception that the spring retainer 72 and associated structure has been removed as the latch plate assembly 50' does not use the spring 56. As with carrier 52, carrier 52' comprises a lower carrier plate 60 and an upper carrier plate 62 and an end 64. The extending end of the lower carrier plate is enlarged at 67 to provide a greater surface area for engagement with the upper tab 32, as also illustrated in FIG. 20. The latch plate assembly 50', in addition to the carrier 52', includes a latching mechanism 54. This latching mechanism 54 is shown in FIGS. 9 and 10. As before, the latching mechanism 54 is inserted within the carrier 52' and includes the latch plate 100 and bushing 102. One end of the latch plate curves upwardly forming a latch or bar 112. At the opposite end, the latch plate 100 curves downwardly at end 114 and may also include the cut-out 116. The latching mechanism 54 is snapped into the carrier 52' in the same way it was snapped into carrier 52.

Reference is now made to FIGS. 24 through 26. The latch plate assembly 50' further includes a spring 200 as illustrated in FIGS. 24 and 25. The spring 200 includes a bent-over end 202 which is inserted over the bar 65 of the carrier 52'. The bar 65 is illustrated in FIGS. 22 and 23. The spring 200 includes a middle portion 204 and an arcuately shaped end 206 which terminates in a flange 208 extending therefrom. For purposes of illustration, the spring 200 has also been shown in dotted line in FIG. 23. The latch plate assembly 50' further includes a roller 210 illustrated in FIG. 26. The roller includes a central portion 212 and flanged rollers 214a and 214b having a diameter greater than the middle portion 212. The distance a between the rollers 214a and 214b is slightly wider than the width b of the spring 200 (shown in FIG. 24). Extending from the flanged rollers are rods 216a and 216b. The width dimension across these rods 216a and 216b is substantially identical to the distance between the side rails 26a and 26b.

The assembled latch plate assembly 50' comprising the carrier 52', latching mechanism 54, spring 200, and roller 210 is shown in FIG. 20. As can be seen in FIG. 20, the roller 210 is inserted within the arcuate end 206 of spring 200. The spring 200 biases the roller against the latch or bar 112.

Assembly of the anchorage illustrated in FIGS. 20 through 26 is performed as follows. The latching member 54 is inserted within the carrier 52'. The spring 200 is inserted within the carrier 52' and thereafter the roller 210 is inserted within the arcuate end 206 of the spring. The latch plate assembly 50' comprising the carrier 52', latching member 54, spring 200 and roller 210, is slid within the top open end 126 of the guide rail 22 with the latch plate end 114 entering the guide rail first. Alternatively, the bar could be inserted into the guide rail first to achieve the configuration shown in FIGS. 1, 3 and 13. The latch plate assembly 50' is depressed such that the bar 112 resides below the front rails 26 thereby partially entrapping the latch plate assembly 50' to the guide rail 22. Thereafter, the latch plate assembly 50' is urged downwardly into the channel 34. Further downward movement of the latch plate assembly 50' enables it to be slid within the rail 22 such that the bar 112 resides within one of the slots or cut-outs 36. When the rail 22 and latch plate assembly 50' are installed within a vehicle, a D-ring 140 such as that illustrated in FIG. 13 is fastened to the bushing 102. In this condition, the spring 200 urges the roller upwardly (as illustrated in FIG. 20) so that the bar 112 is positively latched into one of the slots 36. If the operator of the vehicle desires to change the position of the latch plate assembly 50' relative to the guide rail 22, the D-ring is depressed thereby compressing the carrier 52' and permitting the bar 112 to be positioned inside the top rails 28a and b.

As the latch plate assembly 50' is pushed into the rail, the roller 210 and particularly the flanges 214a and b roll about the curved portion of the bar 112. The movement of the roller 212 around the curved portion of the bar 112 causes the roller to move outwardly in the direction of arrow 220 (as shown in FIG. 20) against the force exerted upon it by the spring 200. With the latch plate assembly 50' is positioned as described above, the occupant can now slide the latch plate assembly 50' within the rail 22 and reposition it within another one of the slots 36. Upon releasing the D-ring 140, the spring 200 which had been extended, exerts a force on the roller 210 which provides an outward force on the bar 112 to maintain same within the chosen slot 36 thereby securely maintaining the bar 112 therein.

Figure 27:
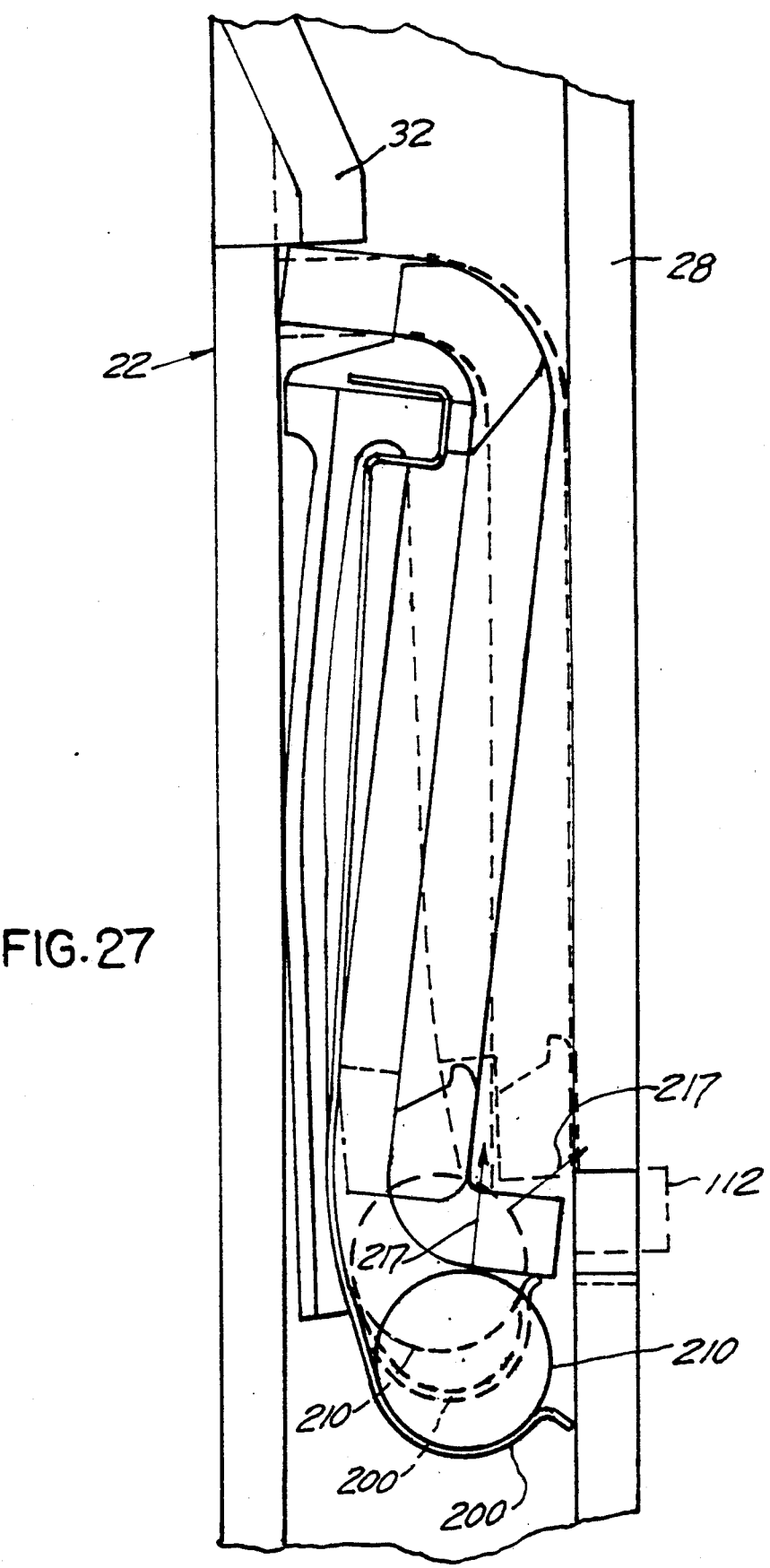
FIG. 27 shows an enlarged view of the latch plate assembly.

Advantages of utilizing the spring 200 and roller 210 is as follows. In the latched position of the latch plate assembly 50' the spring 200 and roller 210 provide a substantial outward force on the latch bar 112 securing same in place. As mentioned above, when the occupant desires to move the latch plate assembly 50' to another slot, the roller 210 rolls about the curved end of the latch bar and also urges the spring 200 outwardly. As the roller is being moved and urging the spring outwardly, the effective outward force imparted to the roller 210 by the spring 200 is lessened. This lessening of the spring force makes it easier for the occupant to depress the latch plate assembly 50' and move same into another slot 36. The spring 200 and roller 210 also stabilize the latch plate assembly and reduce rattling. Reference is briefly made to FIG. 27 which illustrates an enlarged view of the latch plate assembly 50'. The bushing has been removed for clarity. In FIG. 27, the latch plate 100, roller 210 and spring 200 are shown in phantom line and illustrate a latched condition with bar 112 extending in one of the cut-outs 36. The resultant force vector (see arrow 217) imparted by the roller 210 on the bar 112 is also shown. FIG. 27 also shows the latch plate 100, roller 210 and spring 200 in its depressed condition. As can be seen, the resultant force vector extends more horizontally since the point of the tangency between the bar 112 and roller 210 has been changed. By moving the point of tangency, the outward component of the resultant force decreases substantially as the latch plate is depressed making it easier for the occupant to depress the latch plate assembly 50'.

FIGS. 28 through 30 illustrate an alternate embodiment of the invention. FIGS. 28 and 29 illustrate an alternate embodiment of a spring 220 which replaces spring 200 and roller 210. The spring 200 comprises the bent end 206 and a coiled end 222. As with spring 200, spring 220 is inserted within the carrier 52'. FIG. 30 illustrates the assembled latch plate assembly 50' using the spring 220. In the position illustrated in FIG. 30, the rolled end 222 of spring 220 urges the latch bar 112 into the chosen slot 36. When the latch plate assembly 50' is to be moved into another slot 36, the latching mechanism 54 is depressed thereby causing the rolled end 222 of the spring to unroll outwardly as it moves around the curved portion of the bar 112. When the latch plate assembly 50' has been located within another one of the slots 36, the spring 220 compresses thereby outwardly urging the bar 112 through the chosen slot 36.

Reference is made to an alternate embodiment of the invention illustrated in FIG. 31. As will be seen from the description below, the embodiment shown in FIG. 31 illustrates a latch plate assembly 50'' combining various features of the latch plate assemblies shown in FIGS. 13 through 16 and 20 through 23. Returning briefly to the embodiment of the invention illustrated in FIGS. 13, 15 and 16, a bifurcated spring 130 having extending legs 132a and 132b was inserted within the space between the portions 60 and 62 of a carrier 52. In the embodiment of the invention illustrated in FIG. 31, the bifurcated spring 130 is now utilized with the carrier 52'. The legs 132a and 132b act upon the upper and lower carrier plate portion 60 and 62 to provide the bias force necessary to maintain the bar 112 within the chosen slot 36. For purposes of illustration, the guide rail 22 is also shown with a fastener comprising bolt 226. Depending upon the type of installation, a spacer 228 and washer 230 may also be provided about the bolt 226.

Reference is now made to FIGS. 32 and 33 which illustrate a further embodiment of the present invention. As previously mentioned, the rail 22 will be mounted to the B-pillar of a vehicle. Some vehicles of current manufacture include relatively narrow B-pillars. The embodiment of the invention illustrated in FIGS. 32 and 33 illustrate a rail 22 and latch plate assembly 240 adapted for use with vehicles having these narrow B-pillars. Reference is briefly made to FIG. 1 as well as FIG. 21. As can be seen in these figures, the width of the guide rail 22 illustrated therein is in part determined by the diameter of the bushing 102. The width of these guide rails can be made narrower by decreasing the width of the overall rail 22. This decrease would have the effect of narrowing the front faces 28a and 28b which might detract from the structural integrity of the rail 22. FIGS. 32 and 33 illustrate a narrow width rail 22. In this embodiment of the invention a latching mechanism 242 is used which is similar to the latching mechanism 54 discussed above. The latching mechanism 242 includes a latch plate 244 which is slightly narrower than the latch plate 100 illustrated in FIG. 10. The latch plate mechanism 242 replaces the bushing 102 with a threaded stud generally shown as 250. The lower portion 252 of the threaded stud 250 is secured to the latch plate 242 in a manner that the bushing 102 was secured to the latch plate 100 (see FIGS. 9 and 10). The stud 250 includes a medial portion 256 which is oblong shaped as illustrated in FIG. 33. As can be seen, the distance across the truncated sides of this medial portion 256 is substantially smaller than the diameter of the bushing 102 shown in many of the above figures. By using a medial portion 256, the width of the rail 22 may be narrowed while still maintaining the integrity of the front sides 28a and 28b. As illustrated the medial portion 256 extends outwardly from the rail 22 and is received within the space between the front sides 28a and 28b. The threaded stud 250 further includes an integrally formed plate 260 and an increased diameter part 262 which provides a bushing surface about which a D-ring 140 can rotate. The D-ring is secured to the threaded stud 250 by a washer and threaded nut (which are not shown). The latch plate assembly 240 illustrated in FIG. 32 also includes a carrier. This carrier can be carrier 52' as illustrated in FIGS. 22 and 23. Additionally, the latch plate assembly 240 includes a spring to bias the latch plate 242 and in particular the bar 112 outwardly. This spring can be the bifurcated spring 130 or alternatively, springs 200 or 220 illustrated in FIGS. 24 and 27 respectively.

Many changes and modifications in the above described embodiment of the invention can, of course, be carried out without departing from the scope thereof.

Accordingly, that scope is intended to be limited only by the scope of the appended claims.

We claim:

1. An adjustable seat belt anchorage (20, 240) comprising:
   a guide rail (22) adapted to be secured to a portion of a vehicle (24) generally at or above occupant shoulder height, the guide rail (22) forming an open channel (34), a plurality of pairs of cut-outs or slots (36) oppositely positioned in the front walls (28) of the guide rail;
   a latch plate assembly (50'; 50"; 240) comprising:
   a resilient carrier (52', 52") slidingly received within the channel (34) comprising a lower carrier plate (60); slideable on the guide rail (22) and an upper carrier plate (62);
   a latching mechanism (54) biased into the guide rail by the carrier and supported by the upper carrier plate (62) and movable within the carrier including a latch bar means (112, 114) extending outwardly from the carrier for engaging a selected pair of cut-outs or slots (36) and an attachment means (102, 250) for supporting a D-ring (140); wherein the latch bar means includes a bar (112) having an extending first portion (113) which extends from a plate portion (106) and an opposite end (114) extending from the plate portion (106).

2. The anchorage as defined in claim 1 wherein the first portion (113) is positioned in the rail (22) below the opposite end.

3. The anchorage as defined in claim 1 wherein the lower carrier plate (60) and upper carrier plate (62) are of unitary construction and are hinged mounted at an end (65) and wherein a spring assembly (130; 200, 220) is located between the upper and lower carrier plates to supplement the resiliency thereof.

4. The anchorage as defined in claim 3 wherein the spring assembly comprises a flat spring (200), having a flat portion (204), a bent end (202) extending from the flat portion and received about end (64, 65) of the carrier (52', 52") the other end (206) of the spring (200) extending away from the flat portion (204) and being arcuately shaped,
   a roller (210) received in the arcuately shaped end (206), wherein the spring (200) urges the roller (210) against the first portion (113) of the bar 112 to urge the bar (112) outwardly and into the selected slots (36) and when the latch plate assembly is depressed so that the bar (112) resides below the front walls (28), the roller (210) rolls upon the first portion (113) of bar (112) extending the arcuately shaped end (206) of the spring (200) to vary the outward force on the bar (112).

5. The anchorage as defined in claim 3 wherein the spring assembly comprises a flat spring (200), having a flat portion (204), a bent end (202) extending from the flat portion and received about end (64, 65) of the carrier (52', 52") the other end (206) of the spring (200) extending away from the flat portion (204) being coiled, the coiled end (206) engaging the first portion (113) of the bar (112) to urge the bar (112) outwardly into the selected slots (36) and when the latch plate assembly is depressed so that the bar (112) resides below the front walls, the coiled end (220) rolls upon the first portion (113) of the bar (112) and as it does partially uncoils to vary the outward force imparted to the bar (112).

6. The anchorage as defined in claim 4 wherein the roller (210) includes a central portion (212) and oppositely positioned circular flanges (214a, 214b) of diameter greater than the central portion (212) thereof, the flanges (214a, 214b) engaging the bar.

7. The anchorage as defined in claim 6 wherein the roller (210) includes a bar (216a, 216b) extending from each flange (214a, 214b) the ends of each bar (216a, 216b) extending toward the inside of the guide rail (22).

8. The anchorage as defined in claim 6 wherein the arcuately shaped end (206) of the spring (200) wraps around the central portion (212) and is positioned between the flanges (214a, b).

9. The anchorage as defined in claim 6 wherein the arcuately shaped end (206) extends from the flat portion (204) at an angle of approximately 45 degrees.

10. The anchorage as defined in claim 4 wherein the rail (22) includes a tab (32) extending into the channel (34) and wherein an end (67) of the lower carrier plate (60) remote from the hinge end (65), is enlarged to engage the tab (32) to prevent the latch plate assembly (52', 52") from sliding out of the rail (22), the end (67) also providing a pivot point about which the arcuately shaped end (206) can pivot as it is extended when the latch plate assembly is depressed.

11. The anchorage (20) as defined in claim 1 wherein latching mechanism (54) includes an apertured latch plate (100) into which is secured the attachment means (102).

12. The anchorage as defined in claim 11 wherein the attachment means (102) includes a threaded bushing (102), and wherein a D-ring (140) is rotatably secured to the bushing (102).

13. The anchorage as defined in claim 11 wherein the attachment means (102) includes a threaded stud (250) adapted to receive a D-ring (140).

14. The anchorage as defined in claim 13 wherein the threaded stud (250) comprises a medial portion (256) extending away from the latching mechanism (54), the medial portion (256) including flat, narrowly spaced sides slidingly received between the front walls (28).

15. The anchorage as defined in claim 14 wherein the threaded stud (250) includes an integrally formed plate (260) on the medial portion (256), a circular member (262) and threaded portion, the circular member (262) and plate (260) forming surfaces upon which the D-ring (140) can rotate.

16. The anchorage as defined in claim 1 wherein the first portion (113) is position in the rail (22) above the opposite end (114).

* * * * *